Dec. 20, 1955    W. L. GILL    2,727,524
VENT PLUGS FOR AIRCRAFT STORAGE BATTERIES
Filed Dec. 23, 1952

INVENTOR.
WALTER L. GILL
BY
Shepherd Campbell

United States Patent Office 2,727,524
Patented Dec. 20, 1955

2,727,524

VENT PLUGS FOR AIRCRAFT STORAGE BATTERIES

Walter Lawrence Gill, Redlands, Calif.

Application December 23, 1952, Serial No. 327,537

1 Claim. (Cl. 137—43)

This invention relates to storage battery vent plugs and more particularly vent plugs for the storage batteries of aircraft or other tiltable structures.

The invention relates to vents of the character adapted to automatically seal an outlet vent opening under tipping of the aircraft and it contemplates the provision of an improved device of this character which will not be held closed, after the battery resumes an upright position, by gas pressure accumulated after tipping first occurs and while the aircraft and battery are in tipped position. A further advantage inherent in my improved structure is that any condensed electrolyte gathering in the venting structure will be discharged back into the battery instead of being permitted to leak from the outlet end of the vent into surrounding areas.

The means by which these and other advantages are secured will be best understood by reference to the accompanying drawing in which.

Figure 1:
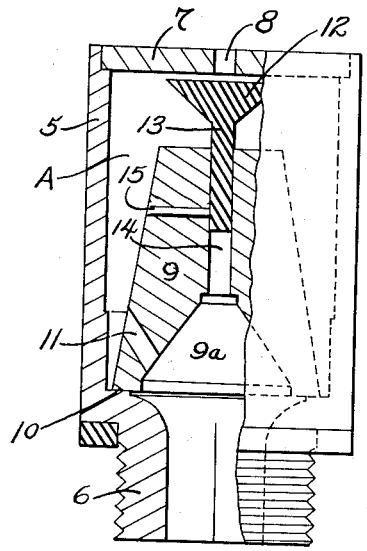
Fig. 1 is a view partly in vertical section and partly in elevation, of a device constructed in accordance with the invention.
Figure 2:
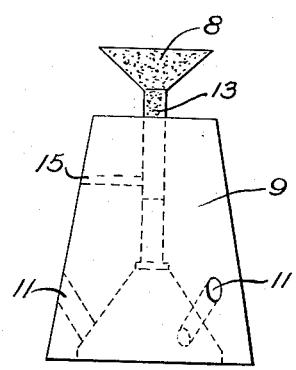
Fig. 2 is a side elevation of the core member of the vent seal.
Figure 3:
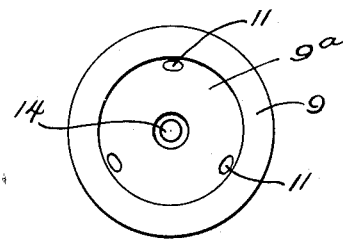
Fig. 3 is an underside view of said core member.

In the drawing 5 designates a tubular casing that is formed of a suitable acid resisting phenolic resin or other suitable acid resisting material. A threaded tubular neck 6 provides means by which the casing may be screwed in the filler or other opening of a conventional, aircraft storage battery. The closure cap or cover 7 of the casing 5 is provided with a relatively small vent opening 8.

A relatively heavy core member is located in the casing 5. This member is in the form of a truncated cone 9, preferably of lead. It is hollowed out at its bottom to form a chamber 9a and the bottom face of the cone, about such chamber, rests upon a ledge 10. The cone is pierced by an opening or openings 11 which establish communication between that portion of the casing above the cone and the tubular neck 6. These openings may be in the form of slits, if desired, since in such form the operation would be the same. Disposed immediately below and in close proximity to vent opening 8 is a novel type of valve 12 which forms an important feature of the invention. This valve is of flexible and elastic material such as rubber, either natural or synthetic. I have found neoprene to be very suitable. The valve is carried by a valve stem 13 also of flexible and elastic material and it may be and preferably is integral with the valve. This stem is secured in a bore 14 of the cone either by cementing or by a transverse pin 15, or both.

The formation of the chamber 9a at the bottom of the cone has the important functional result of shifting the center of gravity of the cone to a higher point than if said chamber were not present. The result is that the tapering cone tilts more readily with this high center of gravity than would be the case if the cone were solid to the bottom. Tilting of the cone, when the aircraft and its battery are tilted results in moving valve 12 to closed position over the mouth of vent opening 8. The fact that both the valve and valve stem are readily bendable permits the valve to seat flat across the vent opening under relatively small degrees of tilt of the aircraft and irrespective of the direction in which the cone and valve are tilted. Because the vent opening to be sealed is located at the outer end of the casing in which valve 5 is disposed, it follows that any gaseous electrolyte trapped against escape when the valve closes and which condenses into liquid before the aircraft and battery resume an upright position will find its way through openings 11 back into the body of the battery proper.

A very important advantage of the present invention resides in the fact that the vent opening is at the outer end of the casing and that the weight of the cone is sufficient to insure opening of the valve when the battery returns to vertical. The only gas pressure tending to keep the valve closed would be the relatively slight pressure upon the rubber valve. The openings 11 assure that the pressure in neck 6 and above the cone, will be equalized. Thus the member which is moving the valve, to wit the cone, is not exerting any gas pressure upon the valve which would tend to keep it closed after return of the aircraft to horizontal position. In some devices of this nature, having valves which close automatically when the aircraft tips, gas pressure built up while the aircraft was in tipped position, has acted upon the valves to hold them closed, even after return of the battery to upright position. By equalizing the pressure both above and below the weighted element 9 the weight readily overcomes the slight pressure upon the valve and insures the opening of the latter.

It is to be understood that the present invention is not limited to the precise construction set forth herein but that it includes within its purview whatever changes fairly come within either the terms or the spirit of the appended claim.

Having described my invention what I claim is:

A storage battery venting structure comprising a cylindrical casing the top of which is closed by a wall having a substantially axial vent opening therethrough and the underface of said wall presenting a flat surface, a heavy metallic core member located in said casing, a circumferential seat within the casing upon which the outer edge portion of the bottom of said core member rests for tilting movement therefrom in all directions, as the said casing tips, a valve and integral valve stem both made of rubber-like elastic material, the stem being affixed axially in the weighted core member and projecting from the top thereof, said valve being mounted upon the top of the stem and having a flat upper face which lies in parallelism with the flat underface of the casing and in slightly spaced relation thereto, when the said casing is in upright position, tilting movement of the core member first bringing an edge portion of the flat upper face of the valve into engagement with the flat underface of the top of the casing, continued tipping movement of the core member out of axial alignment with the axis of the casing bringing the flat upper face of the valve into parallelism with and into uniform contacting relation with the underface of the top of the casing by the bending of the valve stem and without lateral movement of the valve across the casing top, said valve then closing said vent opening.

References Cited in the file of this patent

UNITED STATES PATENTS

| 1,301,993 | Angell | Apr. 29, 1919 |
| 2,074,329 | Gieseman | Mar. 23, 1937 |
| 2,124,455 | Hopkins | July 19, 1938 |
| 2,315,431 | King et al. | Mar. 30, 1943 |
| 2,324,999 | Shinn | July 20, 1943 |
| 2,351,177 | Younkman | June 13, 1944 |
| 2,619,102 | Endress | Nov. 25, 1952 |
| 2,682,569 | Duncan | June 29, 1954 |